United States Patent
Aycock et al.

(10) Patent No.: US 9,423,484 B2
(45) Date of Patent: Aug. 23, 2016

(54) SKY POLARIZATION AND SUN SENSOR SYSTEM AND METHOD

(71) Applicant: Polaris Sensor Technologies, Inc., Huntsville, AL (US)

(72) Inventors: Todd Michael Aycock, Huntsville, AL (US); David Chenault, Huntsville, AL (US); Arthur Lompado, Huntsville, AL (US); J. Larry Pezzaniti, Huntsville, AL (US)

(73) Assignee: Polaris Sensor Technologies, Inc., Huntsville, AL (US)

( * ) Notice: Subject to any disclaimer, the term of this patent is extended or adjusted under 35 U.S.C. 154(b) by 8 days.

(21) Appl. No.: 14/521,401

(22) Filed: Oct. 22, 2014

(65) Prior Publication Data

US 2015/0226827 A1 Aug. 13, 2015

Related U.S. Application Data

(60) Provisional application No. 61/894,023, filed on Oct. 22, 2013.

(51) Int. Cl.
*G06K 9/00* (2006.01)
*G01S 3/786* (2006.01)
(Continued)

(52) U.S. Cl.
CPC .............. *G01S 3/7861* (2013.01); *G01S 3/783* (2013.01); *G01S 5/0263* (2013.01); *G01S 5/163* (2013.01); *G06K 9/00624* (2013.01); *G06K 9/209* (2013.01)

(58) Field of Classification Search
None
See application file for complete search history.

(56) References Cited

U.S. PATENT DOCUMENTS

| 5,712,641 A | 1/1998 | Casabona et al. |
| 5,872,540 A | 2/1999 | Casabona et al. |

(Continued)

FOREIGN PATENT DOCUMENTS

| WO | 2013/034941 | 3/2013 |
| WO | 2013/103725 | 7/2013 |

OTHER PUBLICATIONS

Guan et al "The Novel Method of North-finding Based on the Skylight Polarization", Journal of Engineering Science and Technology Review 6 (1) (2013) 107-110.*

(Continued)

*Primary Examiner* — Andrae S Allison
(74) *Attorney, Agent, or Firm* — Angela Holt; Bradley Arant Boult Cummings LLP

(57) ABSTRACT

A system for determining a new orientation and/or position of an object comprises a sky polarimeter configured to record image data of the sky, a signal processing unit, and logic configured to receive and store in memory the image data received from the sky polarimeter. The logic calculates the Stokes parameters ($S_0$, $S_1$, $S_2$,), DoLP, and AoP from the image data, detects obscurants and filters the obscurants (such as clouds and trees) from the image data to produce a filtered image. The logic is further configured to find the Sun and zenith in the filtered image, and to determine the roll, pitch, yaw, latitude and longitude of the object using the filtered image. A method for determining a new position/ orientation of an object comprises recording raw image data using a sky polarimeter, calculating $S_0$, $S_1$, $S_2$, DoLP, and AoP from the image data, detecting obscurants and filtering the obscurants from the image data to produce a filtered image, obtaining last known position/orientation data of the object, finding the Sun and zenith in the filtered image, and determining the roll, pitch, yaw, latitude and longitude of the object using the filtered image.

9 Claims, 14 Drawing Sheets

(51) Int. Cl.
G06K 9/20 (2006.01)
G01S 3/783 (2006.01)
G01S 5/02 (2010.01)
G01S 5/16 (2006.01)

(56) References Cited

U.S. PATENT DOCUMENTS

| | | | | |
|---|---|---|---|---|
| 6,016,119 | A * | 1/2000 | Krasner | G01S 5/0027 342/357.34 |
| 6,175,327 | B1 * | 1/2001 | Lin | H01Q 3/2611 342/357.64 |
| 6,184,830 | B1 * | 2/2001 | Owens | G01S 3/08 342/368 |
| 7,027,919 | B2 * | 4/2006 | Bernesi | B60R 25/102 307/10.4 |
| 7,373,231 | B2 * | 5/2008 | McClure | A01B 69/004 280/456.1 |
| 8,217,368 | B2 * | 7/2012 | Meyers | G01N 21/21 250/459.1 |
| 8,553,980 | B2 | 10/2013 | Ahn et al. | |
| 8,654,179 | B2 | 2/2014 | Kanamori et al. | |
| 2007/0069946 | A1 * | 3/2007 | Kaplan | G06Q 30/02 342/357.64 |
| 2009/0177398 | A1 | 7/2009 | Belenkii et al. | |
| 2010/0142855 | A1 | 6/2010 | Dokladalova et al. | |
| 2011/0018990 | A1 | 1/2011 | Komoto et al. | |
| 2012/0175496 | A1 | 7/2012 | Vorovitchik | |
| 2012/0242835 | A1 * | 9/2012 | Li | G08G 1/167 348/148 |
| 2014/0022539 | A1 * | 1/2014 | France | G01C 15/00 356/139.1 |
| 2014/0204360 | A1 | 7/2014 | Dowski, Jr. et al. | |

OTHER PUBLICATIONS

Nicolas Lefaudeux ; Nicolas Lechocinski ; Sebastien Breugnot ; Philippe Clemenceau; Compact and robust linear Stokes polarization camera. Proc. SPIE 6972, Polarization: Measurement, Analysis, and Remote Sensing VIII, 69720B (Apr. 1, 2008).*
Sarkar, Mukul; Bello, David San Segundo; van Hoof, Chris; Theuwissen, Albert, "Integrated polarization analyzing CMOS Image sensor for autonomus navigation using polarized light" Intelligent Systems (IS), 2010 5th IEEE International Conference , Issue Date: Jul. 7-9, 2010.*
Voss KJ1, Souaidia N., POLRADS: polarization radiance distribution measurement system. Sep. 13, 2010;18(19):19672-80. doi: 10.1364/OE.18.019672.*
Volker Müller, Polarization-Based Orientation in a Natural Environment, vol. 1811 of the series Lecture Notes in Computer Science pp. 98-107, Feb. 1, 2002.*
Y. Liu and K. J. Voss, "Polarized radiance distribution measurements of skylight: II. experiment and data", 1997, Applied Optics, 36: 8753-8764.[28].*
J. K. Aggarwal et al., "On the Computation of Motion from Sequences of Images—A Review," Proceedings of the IEEE, vol. 76, No. 8, Aug. 1988, pp. 917-935.
Akihiro Horii, "Depth from Defocusing," 1992, 28 pages.
John ENS et al., "An Investigation of Methods for Determining Depth from Focus," IEEE Transactions on Pattern Analysis and Machine Intelligence, vol. 15, No. 2, Feb. 1993, pp. 97-108.
J. Scott Tyo et al., "Review of passive imaging polarimetry for remote sensing applications," Applied Optics, vol. 45, No. 22, Aug. 1, 2006, pp. 5453-5469.
Craig F. Bohren et al., "Absorption and Scattering of Light by Small Particles," John Wiley & Sons, Inc., 1983, pp. 82-136.
Herbert Bay et al., "Speeded-Up Robust Features (SURF)," Computer Vision and Image Understanding 110 (2008), published Dec. 15, 2007, pp. 346-359.
G. Kanbach et al., "OPTIMA: A high time resolution optical photo-polarimeter," High Time Resolution Astrophysics, Springer Astrophys. and Sp. Sci. Library, vol. 351, 2008, pp. 153-169.

Charles D. Campbell, "A Sky Compass for Field Use," Northwest Science, vol. 28, No. 2, 1954, pp. 43-51.
Gábor Horváth et al., "First observation of the fourth neutral polarization point in the atmosphere," J. Opt. Soc. Am. A, vol. 19, No. 10, Oct. 2002, pp. 2085-2099.
M. V. Berry et al., "Polarization singularities in the clear sky," New Journal of Physics 6 (2004) 162, published Nov. 9, 2004, 14 pages.
D. M. O'Brien, "Numerical calculation of the transfer of polarized radiation by a scattering and absorbing atmosphere," CSIRO Atmospheric Research Technical Paper No. 49, CSIRO Atmospheric Research, Victoria, Australia, c2001, 67 pages.
Nathan J. Pust et al., "Digital all-sky polarization imaging of partly cloudy skies," Applied Optics, vol. 47, No. 34, Dec. 1, 2008, published Nov. 19, 2008, pp. H190-H198.
Kenneth J. Voss et al., "Observation of non-principal plane neutral points in the in-water upwelling polarized light field," Optics Express, Mar. 28, 2011, vol. 19, No. 7, published Mar. 16, 2011, pp. 5942-5952.
Z. Ghadyani et al., "Concentric ring metal grating for generating radially polarized light," Applied Optics, Jun. 1, 2011, vol. 50, No. 16, published May 27, 2011, pp. 2451-2457.
József Gál et al., "Polarization patterns of the summer sky and its neutral points measured by full-sky imaging polarimetry in Finnish Lapland north of the Arctic Circle," Proc. R. Soc. Lond. A (2001) 457, pp. 1385-1399.
Andrew R. Dahlberg et al., "Effects of surface reflectance on skylight polarization measurements at the Mauna Loa Observatory," Optics Express, Aug. 15, 2011, vol. 19, No. 17, published Aug. 5, 2011, pp. 16008-16021.
Nathan J. Pust et al., "Comparison of full-sky polarization and radiance observations to radiative transfer simulations which employ AERONET products," Optics Express, Sep. 12, 2011, vol. 19, No. 19, published Sep. 8, 2011, pp. 18602-18613.
Guangyuan He et al., "Generation of radially polarized beams based on thermal analysis of a working cavity," Optics Express, Sep. 12, 2011, vol. 19, No. 19, published Sep. 2, 2011, pp. 18302-18309.
Martynas Beresna et al., "Polarization sensitive elements fabricated by femtosecond laser nanostructuring of glass [Invited]," Optical Materials Express, Aug. 1, 2011, vol. 1, No. 4, published Jul. 29, 2011, pp. 783-795.
Christoph Jocher et al., "Fiber based polarization filter for radially and azimuthally polarized light," Optics Express, Sep. 26, 2011, vol. 19, No. 20, published Sep. 22, 2011, pp. 19582-19590.
R. M. A. Azzam, "Three-dimensional polarization states of monochromatic light fields," J. Opt. Soc. Am. A, vol. 28, No. 11, Nov. 2011, pp. 2279-2283.
Thomas Kämpfe et al., "Depth-minimized, large period half-wave corrugation for linear to radial and azimuthal polarization transformation by grating-mode phase management," J. Opt. Soc. Am. A, vol. 28, No. 11, Nov. 2011, pp. 2235-2242.
Shaoyun Yin et al., "Experimental study on polarization lens formed by asymmetrical metallic hole array," Applied Optics, vol. 50, No. 31, Nov. 1, 2011, pp. G118-G122.
Colin J. R. Sheppard, "Partial polarization in three dimensions," J. Opt. Soc. Am. A, vol. 28, No. 12, Dec. 2011, pp. 2655-2659.
F. K. Fatemi, "Cylindrical vector beams for rapid polarization-dependent measurements in atomic systems," Optics Express, Dec. 5, 2011, vol. 19, No. 25, published Nov. 23, 2011, pp. 25143-25150.
Lin Wu et al., "What makes single-helical metamaterials generate 'pure' circularly polarized light?," Optics Express, Jan. 16, 2012, vol. 20, No. 2, published Jan. 10, 2012, pp. 1552-1560.
Nathan J. Pust et al., "Wavelength dependence of the degree of polarization in cloud-free skies: simulations of real environments," Optics Express, Jul. 2, 2012, vol. 20, No. 14, published Jun. 26, 2012, pp. 15559-15568.
István Pomozi et al., "How the clear-sky angle of polarization pattern continues underneath clouds: full-sky measurements and implications for animal orientation," The Journal of Experimental Biology 204, The Company of Biologists Limited, Great Britain, c2001, pp. 2933-2942.

(56) References Cited

OTHER PUBLICATIONS

Ramón Hegedüs et al., "Polarization patterns of thick clouds: overcast skies have distribution of the angle of polarization similar to that of clear skies," J. Opt. Soc. Am. A, vol. 24, No. 8, Aug. 2007, pp. 2347-2356.
Daisuke Miyazaki et al., "Estimating Sunlight Polarization Using a Fish-eye Lens," IPSJ Journal, vol. 49, No. 4, Apr. 2008, pp. 1234-1246.
O. S. Ougolnikov, "Twilight Sky Photometry and Polarimetry: The Problem of Multiple Scattering at the Twilight Time," Cosmic Research, vol. 37, No. 2, 1999, pp. 159-166. Translated from Kosmicheskie Issledovaniya, vol. 37, No. 2, 1999, pp. 168-175.
Thomas W. Cronin et al., "Celestial polarization patterns during twilight," Applied Optics, vol. 45, No. 22, Aug. 1, 2006, pp. 5582-5589.
Zhao Kaichun et al, "A Novel Structure Design and Angle Algorithm of Imaging Polarization Sensor for Navigation," Proc. of SPIE, vol. 8167, c2011, pp. 81671Z-1-81671Z-6.
Raymond L. Lee, Jr., "Digital imaging of clear-sky polarization," Applied Optics, Mar. 20, 1998, vol. 37, No. 9, pp. 1465-1476.
Glenn S. Smith, "The polarization of skylight: An example from nature," Am. J. Phys. 75 (1), Jan. 2007, pp. 25-35.
Arunkumar Pandian, "Robot navigation using stereo vision and polarization imaging," Institut Universitaire de Technologie IUT Le Creusot, Université de Bourgogne, 2008, 64 pages.
Raymond L. Lee, Jr. et al., "Spectral polarization of clear and hazy coastal skies," Applied Optics, Nov. 1, 2012, vol. 51, No. 31, published Oct. 23, 2012, pp. 7499-7508.
Nathan J. Pust et al., "Dual-field imaging polarimeter using liquid crystal variable retarders," Applied Optics, vol. 45, No. 22, Aug. 1, 2006, pp. 5470-5478.
Nathan J. Pust et al., "Comparison of skylight polarization measurements and MODTRAN-P calculations," Journal of Applied Remote Sensing, vol. 5, 2011, pp. 053529-1-053529-16.
Dimitrios Lambrinos et al., "A mobile robot employing insect strategies for navigation," Feb. 19, 1999, 38 pages.
Ralf Möller et al., "Modeling Ant Navigation with an Autonomous Agent," Proc. SAB'98, 10 pages.
Steven M. Reppert et al., "Polarized Light Helps Monarch Butterflies Navigate," Current Biology, vol. 14, Jan. 20, 2004, pp. 155-158.
Kane Usher et al., "A Camera as a Polarized Light Compass: Preliminary Experiments," Proc. 2001 Australian Conference on Robotics and Automation, Sydney, Nov. 14-15, 2001, pp. 116-120.
Mukul Sarkar et al., "Integrated Polarization Analyzing CMOS Image Sensor for Autonomus Navigation using Polarized Light," IEEE, c2010, 6 pages.
Jinkui Chu et al., "Construction and performance test of a novel polarization sensor for navigation," Sens. Actuators A: Phys. (2008), doi:10.1016/j.sna.2008.07.016, 8 pages.
F. J. Smith, "A New Algorithm for Navigation by Skylight based on Insect Vision," BIOSIGNALS 2008—International Conference on Bio-inspired Systems and Signal Processing, pp. 185-190.
J. A. North et al., "Stokes vector imaging of the polarized sky-dome," Applied Optics, Jan. 20, 1997, vol. 36, No. 3, pp. 723-730.
Mukul Sarkar et al., "Biologically Inspired Autonomous Agent Navigation Using an Integrated Polarization Analyzing CMOS Image Sensor," Procedia Engineering 5 (2010), pp. 673-676.
Guixia Guan et al., "The Novel Method of North-finding Based on the Skylight Polarization," Journal of Engineering Science and Technology Review 6 (1) (2013), pp. 107-110.
Salmah B. Karman et al., "Bio-Inspired Polarized Skylight-Based Navigation Sensors: A Review," Sensors 2012, 12, published Oct. 24, 2012, pp. 14232-14261.
Ying Zhang et al., "Ground-based full-sky imaging polarimeter based on liquid crystal variable retarders," Optics Express, Apr. 7, 2014, vol. 22, No. 7, published Apr. 4, 2014, pp. 8749-8764.
Alexandra Farkas et al., "Accuracy of sun localization in the second step of sky-polarimetric Viking navigation for north determination: a planetarium experiment," J. Opt. Soc. Am. A, vol. 31, No. 7, Jul. 2014, pp. 1645-1656.
David W. Hahn, "Light Scattering Theory," Jul. 2009, 13 pages.
Richard O. Duda et al., "Use of the Hough Transformation to Detect Lines and Curves in Pictures," Communications of the ACM, vol. 15, No. 1, Jan. 1972, pp. 11-15.
"Thrust Area Willful Intents FY12-FY13," Office of Naval Research Code 30, Jan. 2013, 6 pages.
International Search Report and Written Opinion issued Jul. 10, 2015 in corresponding International Application No. PCT/US2014/061847 filed Oct. 22, 2014.
Mukul Sarkar et al., "Integrated Polarization-Analyzing CMOS Image Sensor for Detecting the Incoming Light Ray Direction", IEEE Transaction on Instrumentation and Measurement, vol. 60, No. 8, Aug. 2011, pp. 2759-2767.
Ricardo Marquez et al., "Short Term DNI Forecasting with Sky Imaging Techniques", Proceedings of the Solar Conference, 2, 934-941, 2012.

\* cited by examiner

SKY POLARIZATION AND SUN SENSOR SYSTEM AND METHOD

REFERENCE TO RELATED APPLICATIONS

This application claims priority to Provisional Patent Application U.S. Ser. No. 61/894,023, entitled "Sky Polarization and Sun Sensor for GPS-Denied Localization" and filed on Oct. 22, 2013, which is fully incorporated herein by reference.

GOVERNMENT LICENSE RIGHTS

This invention was made with government support under Contract Number N00014-12-M-0272 awarded by the Department of Defense. The government has certain rights in the invention.

BACKGROUND AND SUMMARY

Currently, in situations where Global Position System (GPS location information is not available, a user typically relies on dead reckoning localization (e.g., using inertial measurements from an inertial measurement unit (IMU)). Such localization analysis, however, is subject to drift and error accumulation. Yaw, for example, is typically calculated using a compass, which can be unreliable due to variations of the earth's magnetic field direction on the surface of the earth, meaning yaw measurements using a compass can be inaccurate by many degrees. Other methods for calculating yaw include measuring celestial features such as the Sun, moon and star positions. These methods can be accurate (less than 1 degree of error), but are subject to reduced availability due to cloud cover, the Sun being out of the field of view, stars not being visible during the daytime, and the like.

According to theory, the observed polarization at any position in the sky depends on the Sun and the sensor platform positions, as well as the sensor pointing direction, where "sensor pointing direction" is the center point of the field of view of the sensor, also known as the target point. The target point, sensor platform position, and sun position together define a plane. Given the Sun's position, which is a function of the time of day, and polarization measurements at one or more unique pointing directions, the sensor absolute position and orientation may be derived. As used herein, "orientation" generally refers to roll, pitch and yaw. "Position" generally refers to latitude and longitude.

A method according to the present disclosure calculates orientation and position parameters using a sky polarimeter that takes polarized images of multiple simultaneous target points in the sky. The orientation and position parameters can be useful to a navigating vehicle (especially if GPS is denied, spoofed, or unavailable), and can work in all types of vehicles (including ground, air and naval vehicles). The orientation and position parameters can also be useful to target locating systems such as far target locators and surveying equipment. The method can provide 0.1 degree yaw accuracy. Further, while the method is typically applied during daylight hours, it is conceivable that the method could be executed at night with some accuracy using the moon instead of the sun.

A system according to an exemplary embodiment of the present disclosure comprises an imaging sensor, polarization state analyzer, optics, mechanical housing, memory and logic circuitry, IMU, GPS, clock, and embedded software that determine the orientation and position parameters. A method according to an exemplary embodiment of the present disclosure comprising using polarization images and prior position/orientation/time data from the GPS, IMU and clock, respectively, to determine expected Sun azimuth and elevation, comparing this expected Sun position to the measured sky polarization pattern, and then filtering to calculate a better orientation and position estimate of the desired object. This localization estimate can be provided in any number of interfaces to a navigation system, a user, a display, or a target locator.

DESCRIPTION OF THE DRAWINGS

The patent or application file contains at least one drawing executed in color. Copies of this patent or patent application publication with color drawings will be provided by the Office upon request and payment of the necessary fee.

FIG. 3b is a continuation of the flowchart of FIG. 3a.

FIG. 6b depicts exemplary scanning polarimeter AoP maps at the same four different times of day as FIG. 6a.

DETAILED DESCRIPTION

Figure 1:
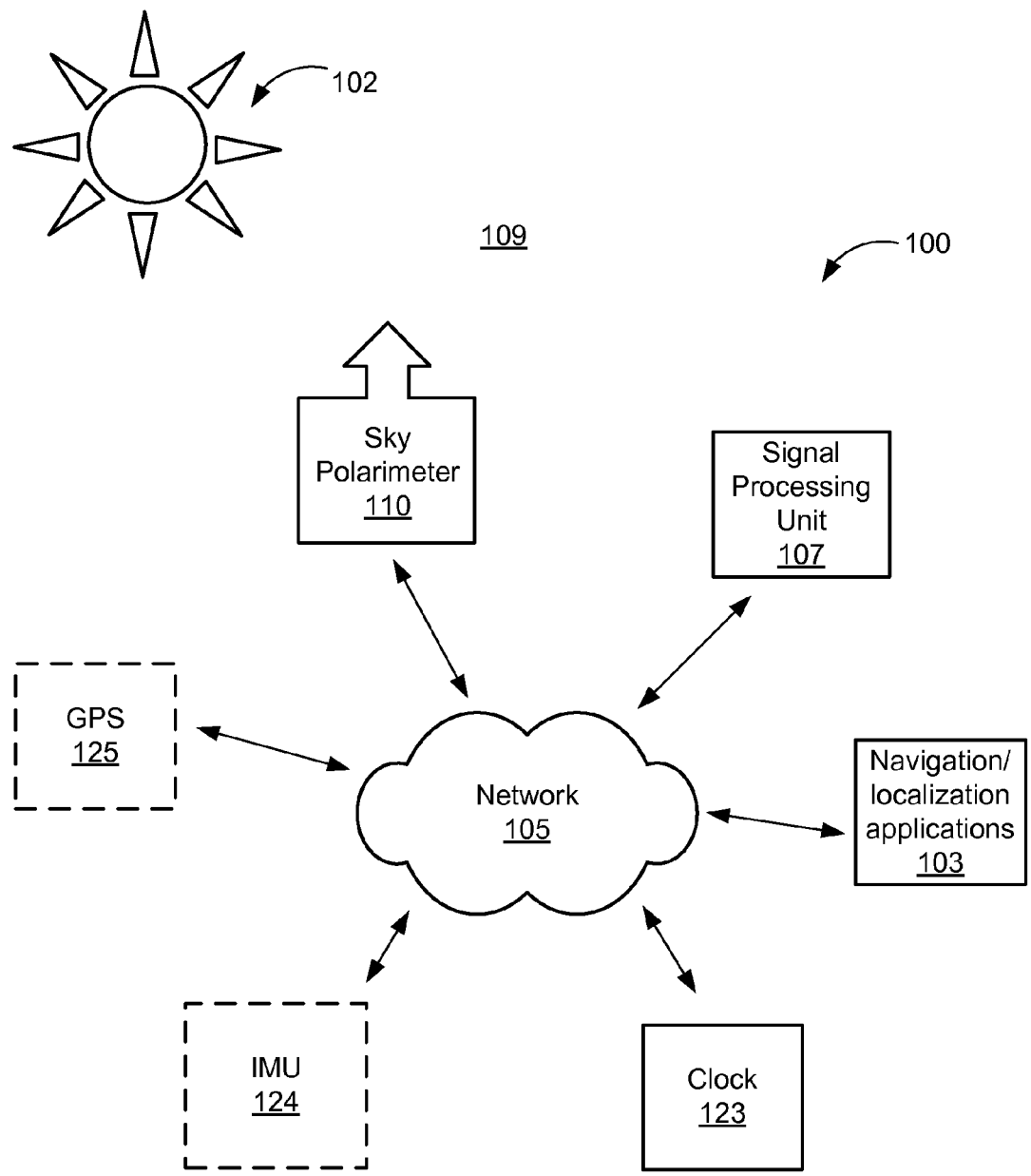
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a sky polarimeter 110 and a signal processing unit 107 which collect and analyze images of the sky 109, respectively.

The sky polarimeter 110 comprises a video imaging device (not shown) for recording polarized images, such as a digital video camera that collects images in its field of view (FOV); in this case, the images recorded are of the sky 109, including the Sun 102, if visible. The sky polarimeter 110 transmits raw image data to the signal processing unit 107, which processes the data and performs navigation and/or localization analysis, as further discussed herein. Although FIG. 1 shows the sky polarimeter 110 and the signal processing unit 107 as two separate items, the sky polarimeter 110 and signal processing unit 107 are packaged into one device in certain embodiments.

The sky polarimeter sends raw image data (not shown) to the signal processing unit 107 over a network 105. The signal processing unit 107 may be any suitable computer known in the art or future-developed. The signal processing unit 107 receives the raw image data, filters the data, and analyzes the data as discussed further herein to provide navigation/localization information (not shown) to navigation/localization applications 103.

The navigation/localization applications 103 may be any of a number of applications wherein localization or navigation data is necessary, for example, in situations where GPS or IMU is not available. Non-limiting examples of navigation/localization applications are: navigation systems, artillery or gun sights, far target locators, personal GPS units, mobile devices, surveying equipment, auto-pilot systems, and the like.

The system 100 may comprise a Global Positioning System (GPS) 125 and/or an Inertial Measurement Unit (IMU) 124. A Global Positioning System is a satellite-based location device that provides a user with latitude and longitude information. An inertial measurement unit is an electronic device that measures and reports on a object's/platform's velocity and/or orientation, providing a user with roll, pitch and yaw information. Even though an exemplary use of the system 100 is for GPS-denied and/or IMU-denied environments, in some instances a navigation system (not shown) will have GPS and IMUs available for a time. In those instances, the GPS- and IMU-provided information may be used to inform the results of the localization analysis, as further discussed herein.

In some embodiments, the system 100 further comprises a clock 123 to provide the current time and date. Time/date may alternatively be available in the GPS.

The network 105 may be of any type network or networks known in the art or future developed, such as the internet backbone, Ethernet, Wifi, WiMax, broadband over power line, coaxial cable, and the like. The network 105 may be any combination of hardware, software, or both.

Figure 2:
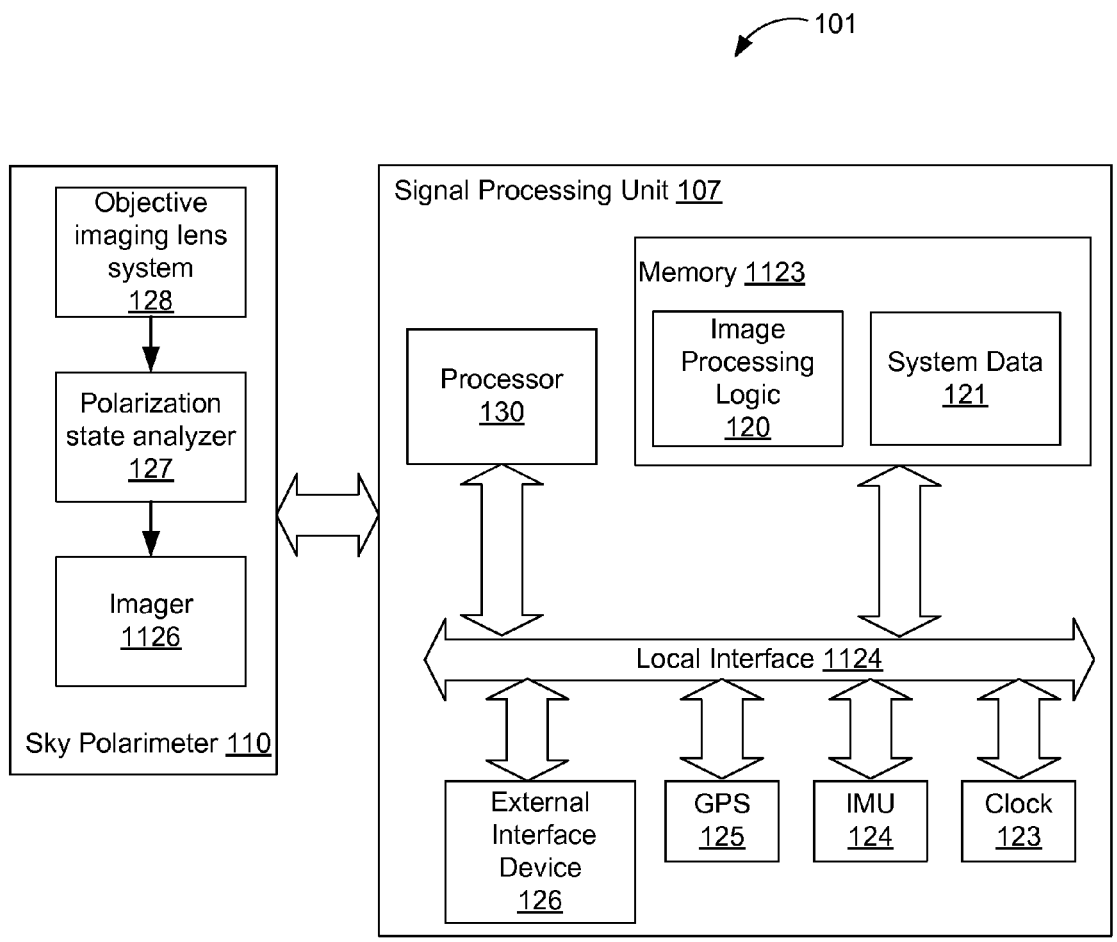
FIG. 2 depicts an exemplary sky polarimeter and signal processing unit as depicted in FIG. 1.

FIG. 2 depicts an exemplary sky polarimeter 110 and signal processing unit 107 according to an embodiment of the present disclosure. The sky polarimeter 110 and signal processing unit 107 are sometimes referred to herein collectively as the sky polarimetry sensor 101.

The sky polarimeter 110 comprises an objective imaging lens system 128, a polarization state analyzer 127, and an imager 1126. The objective imaging lens system 128 comprises a plurality of optical trains (not shown) pointed at the sky 109 (FIG. 1). The polarization state analyzer 127 filters the images received from the objective imaging lens system 148. The imager 1126 comprises a focal plane array (not shown) that comprises an array of light sensing pixels. The sky polarimeter 110 is discussed further with respect to FIG. 11 herein.

The signal processing unit 107 comprises image processing logic 120 and system data 121. In the exemplary signal processing unit 107 image processing logic 120 and system data 121 are shown as stored in memory 1123. The image processing logic 120 and system data 121 may be implemented in hardware, software, or a combination of hardware and software.

The signal processing unit 107 also comprises a processor 130, which comprises a digital processor or other type of circuitry configured to run the image processing logic 120 by processing the image processing logic 120, as applicable. The processor 130 communicates to and drives the other elements within the signal processing unit 107 via a local interface 1124, which can include one or more buses. When stored in memory 1123, the image processing logic 120 and the system data 121 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3A:
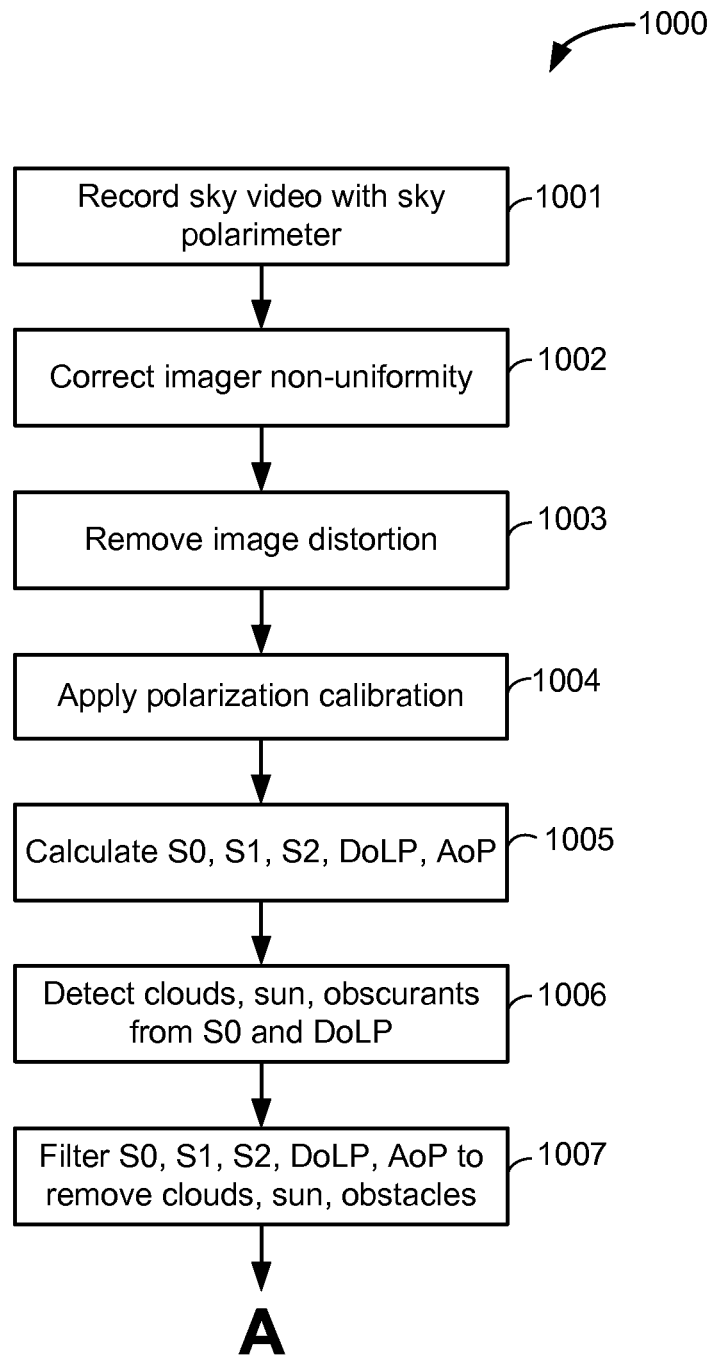
FIG. 3a is a flowchart depicting exemplary architecture and functionality of the system logic in accordance with an exemplary embodiment of the disclosure.
Figure 3B:
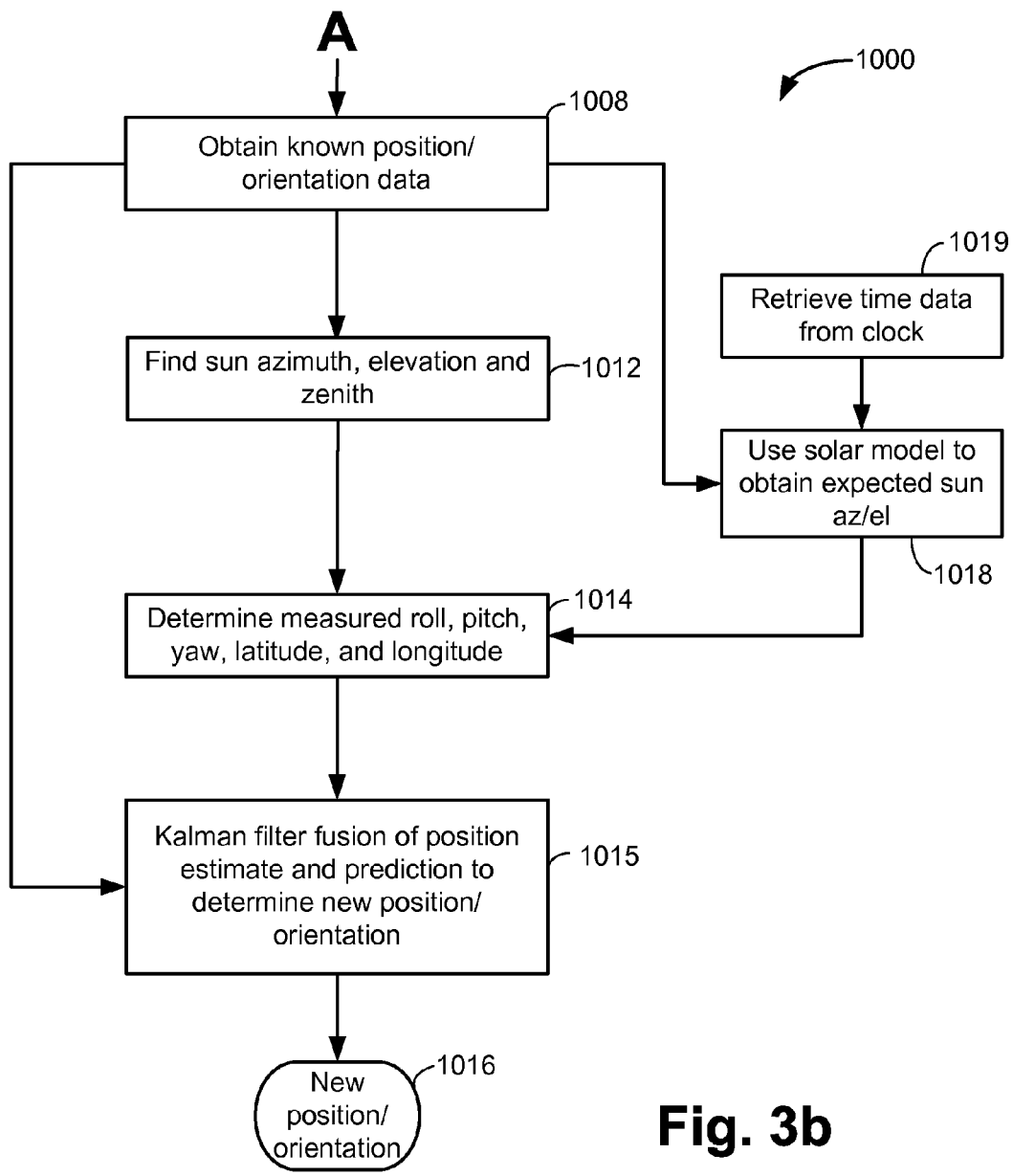
Figure 4:
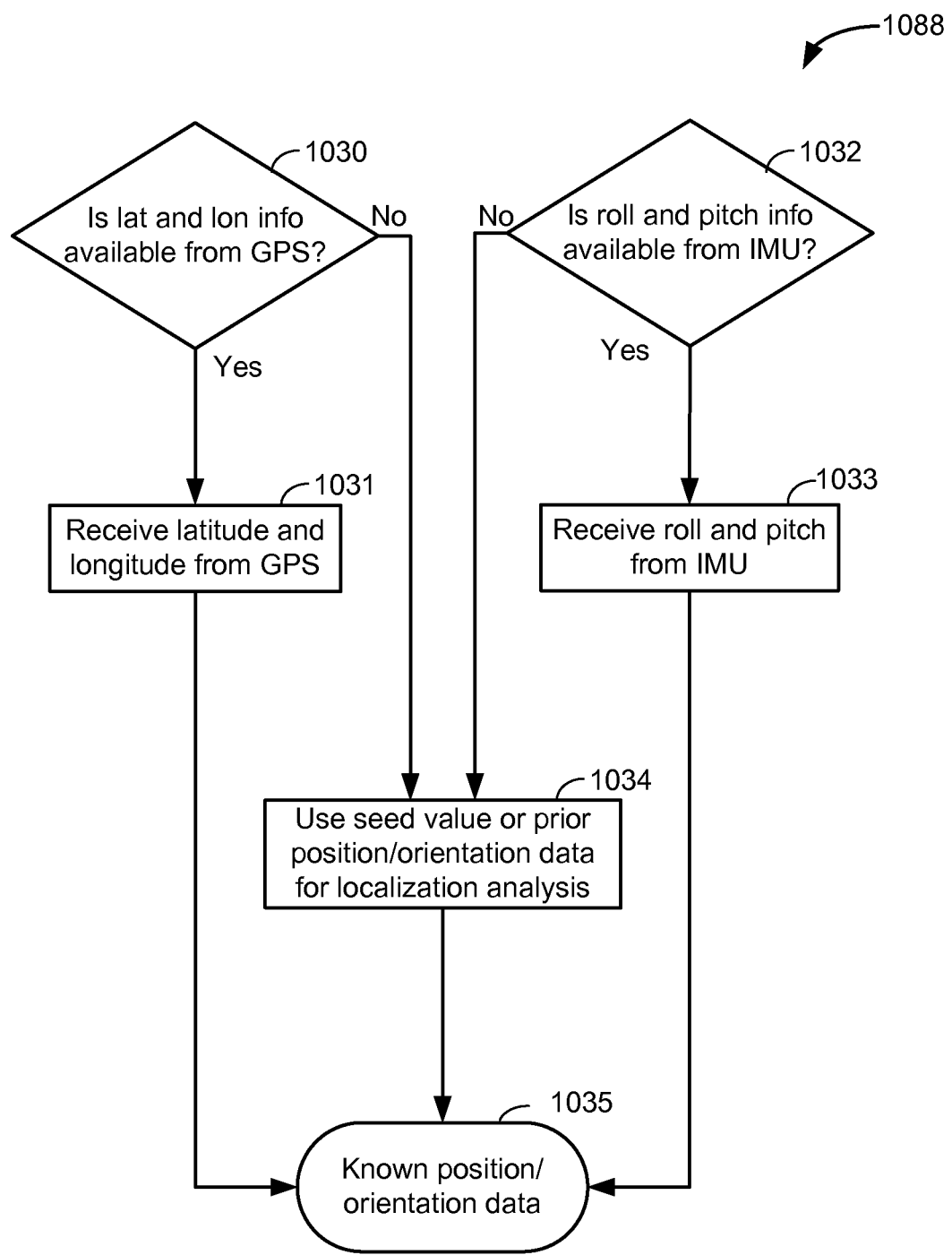
FIG. 4 is a flowchart depicting exemplary architecture and functionality of the step of obtaining known position/orientation data, as depicted in FIG. 3b.
Figure 5:
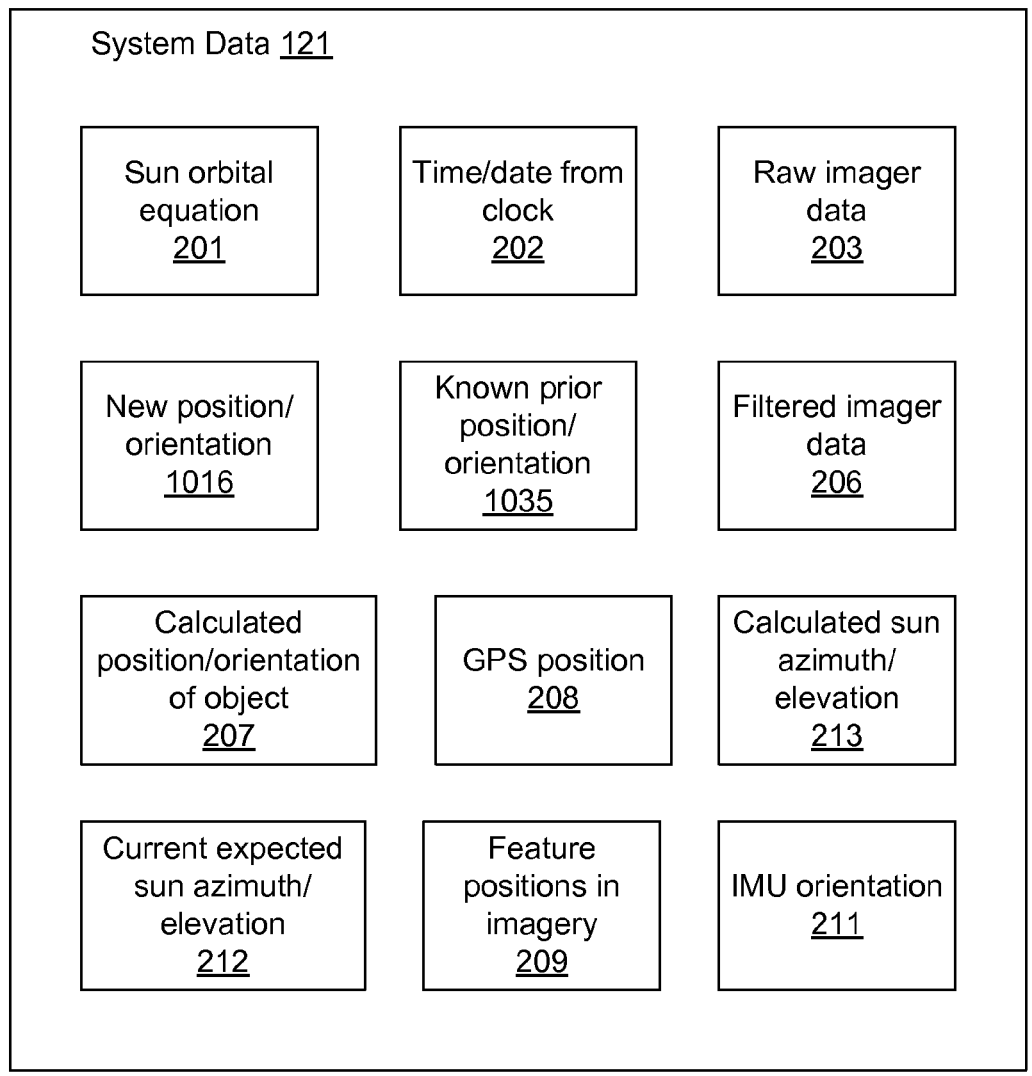
FIG. 5 depicts exemplary system data of FIG. 2.

Exemplary system data 121 is depicted in FIG. 5 and comprises:

a. A "Sun orbital equation" 201, which is the physics that describes the mechanics of the Sun. The Sun orbital equation is implemented as an equation stored in memory 1123 or a lookup table.

b. "Time/date from clock/GPS" 202, which is current time and date information from either the GPS 125 or the clock 123.

c. "Raw imager data" 203, which is raw image data from the imager 1126 (FIG. 2).

d. "New position/orientation" 1016 (FIG. 3b), which is the Kalman-filtered position/orientation after step 1015 of the method 1000 (FIG. 3b).

e. "Known prior position/orientation" 1035 (FIG. 4), which is the position/orientation from prior timestep, obtained from the method 1088 (FIG. 4).

f. "Filtered imager data" 206, which is the data that has been filtered per step 1007 of the method 1000 (FIG. 3a).

g. "Calculated position/orientation of object" 207, which is the data obtained from step 1014 of the method 1000 (FIG. 3b).

h. "GPS position" 208, which is the prior position obtained from the GPS 125 (FIG. 1) and used in step 1031 of method 1088 (FIG. 4).

i. "Feature positions in imagery" 209, which are the features found in step 1012 (FIG. 3b).

j. "IMU orientation" 211, which is the orientation obtained from the IMU 124 (FIG. 1) and used in step 1033 of the method 1088 (FIG. 4).

k. "Current expected Sun azimuth/elevation" 212, which is the expected Sun position calculated using the Sun orbital equation" 201 and the output of step 1018.

l. "Calculated Sun azimuth/elevation" 213, which is the output of step 1012 of the method 1000 (FIG. 3b).

The image processing logic 120 executes the processes described herein with respect to FIGS. 3a, 3b, 4, 7 and 7a.

Referring to FIG. 2, an external interface device 126 connects to and communicates with the navigation/localization applications 103. The external interface device 126 may also communicate with or comprise an input device, for example, a keyboard, a switch, a mouse, and/or other type of interface, which can be used to input data from a user of the system 100. The external interface device 126 may also communicate with or comprise a display device (not shown) that can be used to display data to the user. The external interface device 126 may also or alternatively communicate with or comprise a personal digital assistant (PDA), computer tablet device, laptop, portable or non-portable computer, cellular or mobile phone, or the like. The external interface device may also or alternatively communicate with or comprise a non-personal computer, e.g., a server, embedded computer, FPGA, microprocessor, or the like.

The external interface device 126, GPS 125, IMU 124, and clock 123 are shown as part of the signal processing unit 107 in the exemplary embodiment of FIG. 2. In other embodiments, the external interface device 126, GPS 125, IMU 124, and/or clock 123 may be outside of the signal processing unit and/or part of the navigation/localization applications 103.

Figure 11:
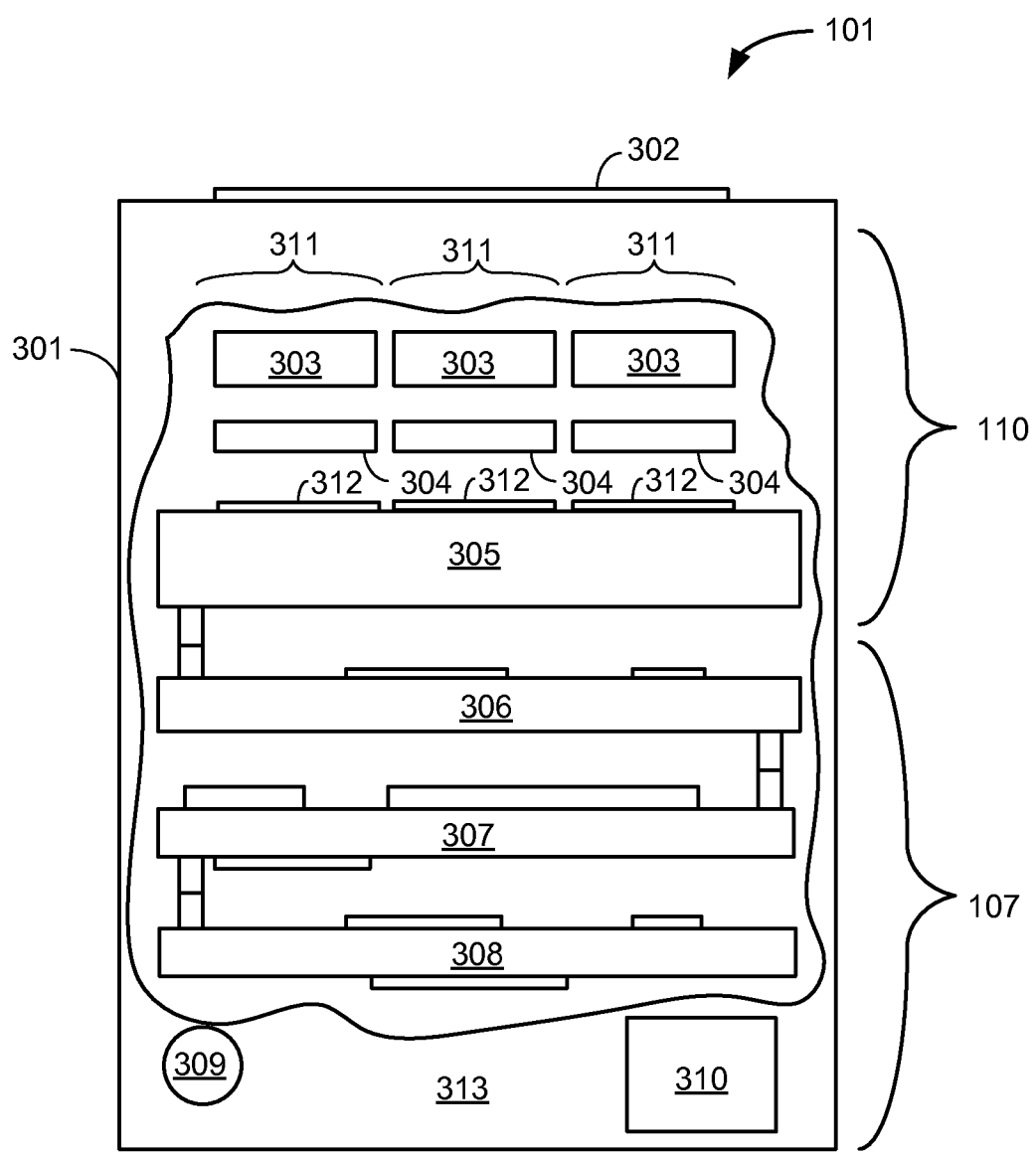
FIG. 11 depicts a sky polarimetry sensor in accordance with an embodiment of the present disclosure.

FIG. 3a is a flowchart depicting exemplary architecture and functionality of the image processing logic 120 (FIG. 2) in accordance with a method 1000. In step 1001 of the method 1000, the sky polarimeter 110 records images of the sky 109 (FIG. 1) and sends raw image data to the signal processing unit 107 (FIG. 1). An exemplary sky polarimetry sensor 101 according to an embodiment of the disclosure is depicted in FIG. 11 and described in more detail with respect thereto.

In step 1002, the signal processing unit 107 (FIG. 1) corrects imager non-uniformity of the images received from the sky polarimeter 110. Examples of imager non-uniformity include fixed pattern lines in the image, noisy pixels, bright spots, and the like. Algorithms that are known in the art may be used for correcting the imager non-uniformity. In some embodiments, step 1002 is not performed because the imager non-uniformity does not require correction.

In other embodiments, a frame averaging step (not shown) is performed between step 1001 and 1002 to improve signal-to-noise ratio and thereby improve the accuracy of the system.

In step 1003, the signal processing unit 107 removes image distortion from the image data. An example of image distortion is warping at the edges of the image caused by the objective imaging lens system. Algorithms that are known in the art may be used for correcting image distortion. In some embodiments, step 1003 is not performed.

In step 1004, the signal processing unit 107 applies polarization calibration to correct fir flaws in the polarizer (not shown) or lenses (not shown) of the sky polarimeter 110 (FIG. 1). The polarization calibration eliminates the inherent polarization signature of the polarimeter so that the image reflects the polarization properties of the sky only, and not an image modified by the signature of the polarimeter itself. The polarization calibration uses a single calibration coefficient for an entire image in some instances, and uses a pixel-by-pixel changing coefficient in other instances, for more accuracy.

In some embodiments, the method 1000 "splits" into three or more independent, parallel-processed polarization images, each with a different polarization state, one for each optical channel in the sky polarizer 110 (FIG. 11). Further, some embodiments have one or more additional "open" optical channel, as discussed with respect to FIG. 11 herein. Images from such open channels will not require steps 1004 or 1005.

In some embodiments, an image registration step (not shown) is performed to spatially register the three or more independent polarization images of the sky polarimetry sensor 101 (FIG. 11) with each other. Such an image registration step is not required if a mechanical registration is sufficient.

In some embodiments, an image registration step (not shown) is performed to spatially register the three or more independent polarization images of the sky polarimetry sensor 101 (FIG. In step 1005, the Stokes parameters ($S_0$, $S_1$, $S_2$), DoLP, and AoP are calculated from the resultant image. A detailed discussion of the Stokes parameters can be found below.

In step 1006, the signal processing unit 107 detects clouds, the Sun, and other obscurants using $S_0$ and DoLP, and in step 1007, the signal processing unit 107 filters $S_0$, $S_1$, $S_2$, DoLP, and AoP to mask regions where clouds and obscurants were detected in step 1006. Because the polarization pattern of the sky 109 (FIG. 1) changes very slowly, the sky 109 will appear very flat and smooth in the $S_0$ and DoLP images. Clouds and trees (not shown), for example, will appear as large highly depolarized areas in the DoLP, or bright/dark areas in $S_0$, and can be masked or filtered out using $S_0$ and DoLP, applying methods that are known in the art.

FIG. 3b is a continuation of the flow chart of FIG. 3a. In step 1008, the latest known position/orientation data is obtained. This data will be used to refine the position/orientation information that results from the process 1000.

FIG. 4 depicts an exemplary method 1088 for the step 1008 for gathering the latest known position/orientation data. In step 1030, the signal processing unit 107 checks to see if current latitude and longitude information is available from GPS 125 (FIG. 1). If current latitude and longitude information is available, then in step 1031, the signal processing unit 107 obtains that data. If current latitude and longitude information is not available from GPS 125, then in step 1034 the signal processing unit 107 can use a seed value or prior position data for the localization analysis. In this regard, there may be prior GPS data available, and if not, the user could input his last known location.

In step 1032, the signal processing unit 107 checks to see if current roll and pitch information is available from an IMU 124 (FIG. 1). If current roll and pitch information is available, then in step 1033, the signal processing unit 107 obtains that data. If current roll and pitch information is not available from IMU 124, then in step 1034 the signal processing unit 107 can use a seed value or prior orientation data for the analysis. In this regard, there may be prior IMU orientation data available, and if not, the user could input his last known orientation. As a result of the process 1088, the signal processing unit 107 will have obtained the latest known position/orientation data 1035.

Figure 7:
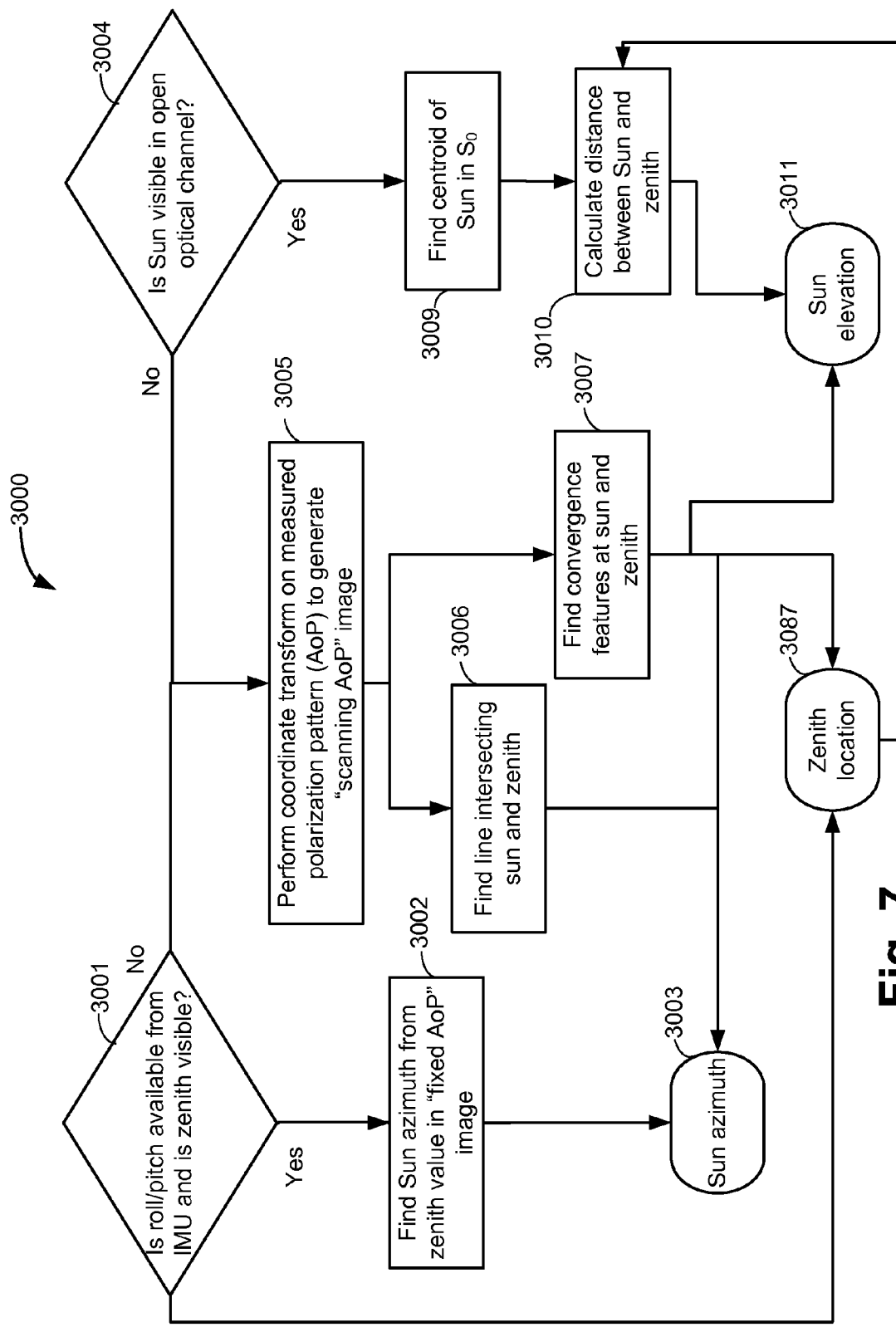
FIG. 7 depicts an exemplary method for calculating Sun azimuth and elevation using sky polarization measurements, general latitude and longitude position, roll/pitch, and time/date.

Referring back to FIG. 3b, in step 1012, the sun azimuth, elevation, and zenith are obtained. FIG. 7 depicts an exemplary method 3000 for finding the sun azimuth, elevation, and zenith.

In parallel with step 1012, the signal processing unit 107 in step 1018 uses the Sun orbital equation 201 (FIG. 5) to calculate the expected Sun azimuth and elevation, using the known position/orientation data from step 1008, and time data retrieved from the clock 123 (FIG. 1) in step 1019.

In step 1014, the measured roll, pitch, and yaw are determined using the measured Sun azimuth/elevation from step 1013 and the expected Sun azimuth/elevation from step 1018. In this regard, the roll and pitch are obtained from the zenith value, by measuring the displacement of the zenith from the center of the focal plane array. The yaw is the difference between the measured sun azimuth 3003 (obtained from method 3000 (FIG. 7)) and the expected sun azimuth (obtained from step 1018 (FIG. 3b)). And finally, the latitude and longitude are calculated from comparing the sun elevation 3011 (obtained from method 3000 (FIG. 7)) to the expected sun elevation (obtained from step 1018 (FIG. 3b) given the time/date from step 1019 (FIG. 3b).

In step 1015, the prior position estimate and new position prediction are fused via Kalman filtering or variants to determine a new position/orientation 1016, using a method known in the art.

Fundamentals of Imaging Polarimetry

Polarization of light results from the vector nature of light (as an electromagnetic wave). It is a fundamental, independent quantity so that two beams of light with the same amplitude and wavelength can have very different polarization states.

Polarimetry is simply the measurement of the polarization state of an incident beam of light. In its simplest form, imaging polarimetry can be accomplished by taking two recordings with two different orientations of a linear polarizer. The linear polarizer oriented at some angle, θ, filters the orthogonal state, and if n images are collected for some Δθ (such that Δθ=π/n, where n is suitably large enough; e.g. n>3), then a sinusoidal modulation will be evident in those regions of the image that are, to some degree, polarized. The degree of polarization, from 0% to 100%, is directly related to the depth of modulation, so that completely unpolarized regions undergo no modulation throughout the rotation of the linear polarizer.

While this description of polarimetry is somewhat intuitive, it is not necessarily helpful or convenient in a quantitative representation of the polarization content of a single pixel of an image or a single light beam. This analysis uses the Stokes vector, first introduced by G. G. Stokes in 1852, in which $$S = \begin{bmatrix} s_0 \\ s_1 \\ s_2 \\ s_3 \end{bmatrix} = \begin{bmatrix} \langle |E_x|^2 + |E_y|^2 \rangle \\ \langle |E_x|^2 - |E_y|^2 \rangle \\ 2\mathrm{Re}\langle E_x E_y^* \rangle \\ -2\mathrm{Im}\langle E_x E_y^* \rangle \end{bmatrix} \propto \begin{bmatrix} I_0 + I_{90} \\ I_0 - I_{90} \\ I_{45} - I_{135} \\ I_L - I_R \end{bmatrix}, \quad (1)$$

where $E_x$ and $E_y$ are the component electric field amplitudes and I is the radiance collected by the camera equipped with a polarizer at the appropriate orientation. The first two components of the Stokes vector ($S_0$ and $S_1$) are measured using a linear polarizer orientated at 0° and 90° (horizontal and vertical). The subscripts of I in Equation 1 for $S_0$ and $S_1$ correspond to the orientation of the linear polarizer. The $S_0$ component is found by summing the two intensity measurements and is exactly equal to the standard radiance image from a "normal" camera. The $S_1$ component is determined by subtracting the two intensity measurements and is therefore referred to as the degree of horizontal polarization. Similarly, $S_2$ is the degree of 45° polarization. The $I_L$ and $I_R$ refer to the radiance collected by the camera if it were equipped with left and right circular polarizers, so $S_3$ is called the degree of circular polarization.

With the Stokes vector defined, two important components derive directly from the Stokes vector and are used: the degree of linear polarization (DoLP) and the angle of polarization (AoP). The DoLP represents the percentage of light that is linearly polarized, such that $$DoLP = \frac{\sqrt{s_1^2 + s_2^2}}{S_0}. \quad (2)$$

Additionally, the AoP, also called the polarization orientation, represents the dominant orientation of linearly polarized light, defined as $$AOP = \tan^{-1}\left(\frac{s_2}{s_1}\right). \quad (3)$$

Rayleigh Scattering Theory

Within the atmosphere, Rayleigh scattering of light causes a defined polarization pattern, which is dependent on the celestial position of the Sun or moon and the observer's relative position and pointing direction (or orientation). The majority of this scattering occurs by air molecules (specifically nitrogen and oxygen) in the stratosphere at roughly 30 km above sea level. The polarization state of this scattered light is described using the previously defined Stokes vector (Equation 1) and its components, where $S_0$ represents the overall intensity (radiance), DoLP represents the percentage of light that is linearly polarized (Equation 2), and AoP represents the orientation angle of the linearly polarized light (Equation 3).

It is important to note that the light that is scattered at an angle of 90° from an unpolarized light source (e.g., the Sun or the moon) will be highly linearly polarized. Likewise, light that is scattered at an angle of 0° will be unpolarized. Therefore, the polarization pattern of the sky is primarily dependent on the angle formed between the observer, the scattering position (i.e., the target point in the sky), and the light source (which can be the Sun or moon). Since the scattering plane is static, and assuming the observer is stationary, the polarization pattern will depend on the celestial position of the Sun or moon and the latitude and longitude of the sensor. The key point is that the celestial position of the Sun/moon can be used for navigational purposes; therefore, a map which describes the position of the Sun/moon relative to the observer and relative to a fixed scattering plane can provide a wealth of information to help deduce the observer's position/orientation.

Since the Rayleigh scattering effect is based on a number of variables, the observed sky polarization pattern changes based on the date/time and the latitude, longitude, and orientation of the sensor. Therefore, three of these parameters (sensor latitude, longitude, and orientation) can be predicted as long as the date/time is known and a sufficient number of distinct polarization measurements of the sky are made. This would allow for absolute positioning simply based on multiple distinct views of the sky or a single, large field of view (FOV) image.

Note that additionally, while intensity and DoLP are affected by clouds and other atmospheric conditions that partially depolarize the light, the AoP often does not change in these conditions; this is because it relates only to the residual polarized light which has transmitted through the cloud, not the light scattered by the cloud which is unpolarized. The important point is that the AoP pattern of the sky typically sustains despite the presence of intervening clouds, and any unscattered transmitted light will retain the orientation information required to localize the sensor. While this may represent a small fraction of the light incident onto the clouds, potentially leading to low signal-to-noise ratio (SNR) problems, it nonetheless contains exactly the information needed to determine the sensor's orientation and position.

Transformation to Scanning Polarimeter Coordinate System

There are two general ways to measure the angle of polarization (AoP) of the sky: using a scanning polarimeter where the sky polarization sensor sequentially measures each discrete point in the sky by pointing directly towards it; and using a fixed polarimeter where the focal plane array (FPA) is fixed and each discrete point in the sky enters the optical system with a different angle simultaneously. The system of the present disclosure uses a fixed polarimeter; however, the representation of the polarization pattern generated by a scanning polarimeter is useful for navigational purposes due to the appearance of a convergence point feature at the zenith from which latitude, longitude, and yaw can be extracted. Incidentally, the measured polarization patterns differ because the scanning polarimeter has an associated changing coordinate system that changes with each target position while the FPA-based measurement has a single common coordinate system for each pixel. Therefore, a method to transform the polarization map measured by a fixed polarimeter to a navigational map was developed. Note that both polarization maps represent the same data measured using different methods and presented in different coordinate systems.

Figure 6A:
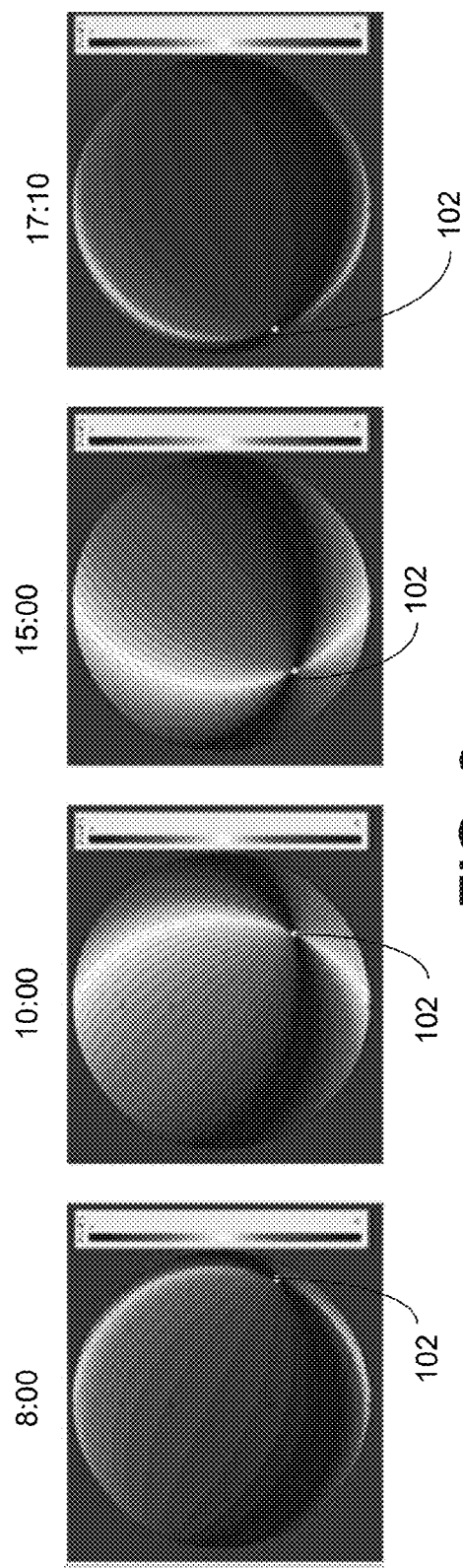
FIG. 6a depicts exemplary fixed polarimeter AoP maps at four different times of the day.
Figure 6B:
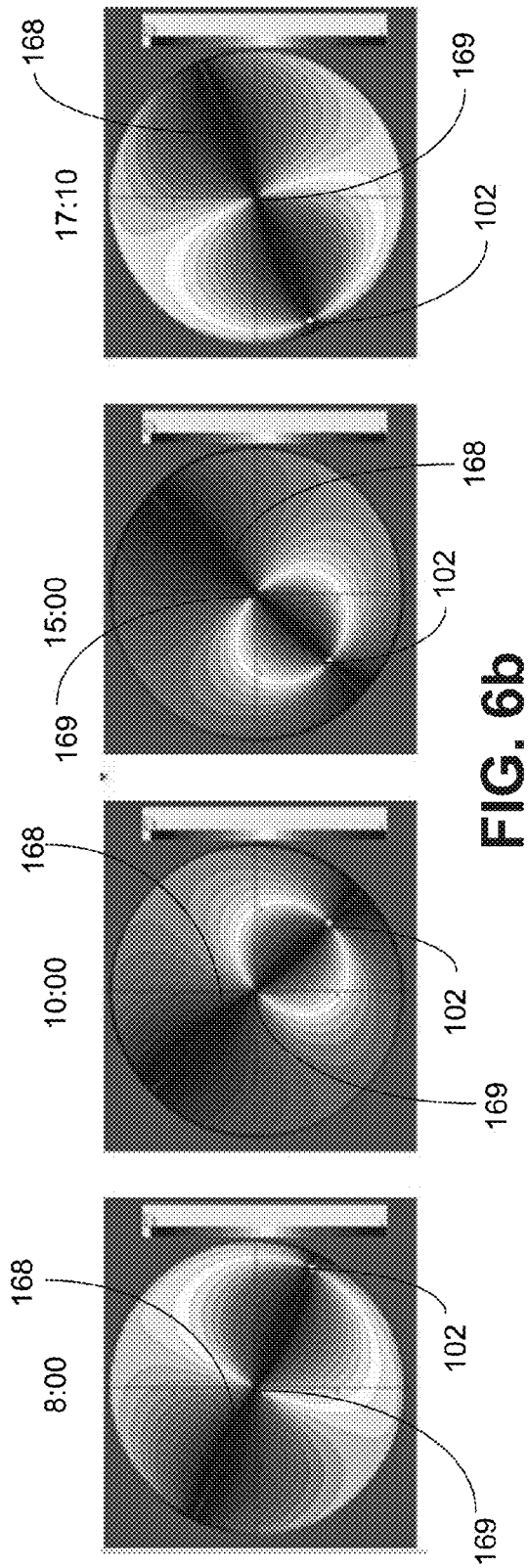

FIGS. 6a and 6b depict the results of the platform coordinate transform. Specifically, FIG. 6a depicts exemplary fixed polarimeter AoP maps at four (4) different times of the day. FIG. 6b depicts exemplary scanning polarimeter AoP maps at the same four different times of day as FIG. 6a. A coordinate transform based on the known relationship between the coordinate systems was used to convert from the fixed polarimeter maps of FIG. 6a to the scanning polarimeter maps of FIG. 6b. The figures depict polar plot projections where radius represents altitude, angle represents azimuth, and the yellow disk represents the Sun 102.

The AoP of 0° and 180° indicates alignment to the imager's x-axis; ±90° both indicate alignment along the imager's y-axis. The data illustrated is representative of a Huntsville, Ala. sensor on Oct. 31, 2012. The sky is assumed to be cloudless and the collected light derived from single scattering (Rayleigh) phenomena in the atmosphere. Light, patchy clouds will not drastically affect the pattern making the single scattering assumption a simplification that is applicable to many measurement situations.

The FIG. 6a AoP maps are in the FPA coordinate system (i.e. what was measured), while the FIG. 6b maps show AoP in scanning polarimeter coordinates. Note the appearance of a discernible line feature 168 in the scanning AoP plots across the sky connecting the Sun 102 and zenith 169 positions (the zenith 169 being the node at the center of the map where the axes cross). The zenith is defined as the point in the sky or celestial sphere directly above the observer. Similarly, convergence points located at the zenith and the Sun can be used to determine useful navigation data as described below.

Finding the Sun and Zenith Positions

Based on the transformed AoP maps and the observation of multiple line and nodal features indicating the Sun and zenith, a method was developed to find the spatial relationships between these two points. These relationships can be used to determine the measured Sun azimuth and elevation. This method presumes the sensor and platform coordinate systems are aligned (e.g., the platform forward direction is the sensor's negative y-direction), or that any offset is known, constant, and can therefore be incorporated into the data reduction to determine platform yaw.

FIG. 7 illustrates an exemplary method 3000 for performing step 1012 of the method 1000 (FIG. 3b) and calculating platform yaw using only sky polarization measurements, general latitude and longitude position, and time/date.

In step 3001, the signal processing unit 107 determines whether roll/pitch information is available from an IMU 124 and whether the zenith is visible. If both are available, then in step 3002 the Sun azimuth 3003 can be found directly from the AoP value at the zenith in the "fixed AoP" image.

If the roll/pitch information is not available or the zenith is not visible, then in step 3005, a coordinate transform is performed on the measured polarization pattern to change the pattern to one containing discernible features useful for navigation, i.e., a "scanning AoP" image. The coordinate transform discussed above is used for this step in one embodiment. Step 3005 is depicted in FIGS. 6a and 6b, where the scanning AoP image is in FIG. 6b.

In step 3006, the signal processing unit 107 finds a line intersecting the sun and zenith. In one embodiment, the line intersecting the sun and zenith is performed using a method 4000 shown in FIG. 7a.

Figure 8D:
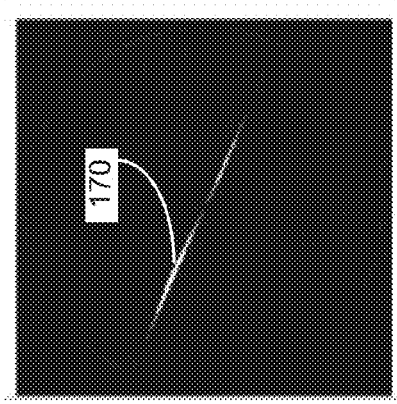
FIGS. 8a-8d depict exemplary steps in a method for performing a yaw algorithm.
Figure 8C:
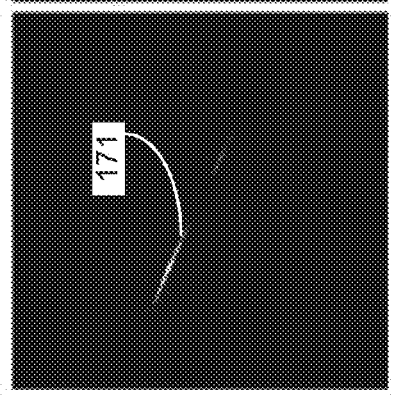

In step 4001 of the method 4000, a minimum detection is performed to extract the region of the image connecting the Sun and the zenith. A threshold is applied to this output image to convert the image to a binary image. FIG. 8a depicts an exemplary image from the minimum detection step 4001, to extract a region of the image 170 connecting the Sun (not shown) and zenith (not shown).

Figure 7A:
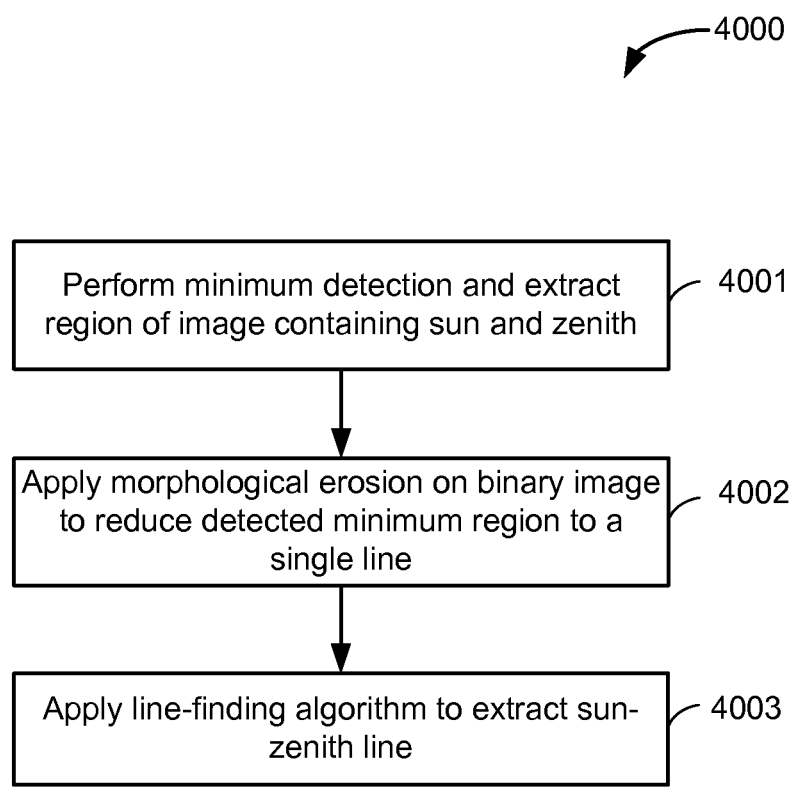
FIG. 7a depicts an exemplary method of finding the line intersecting the sun and zenith.
Figure 8B:
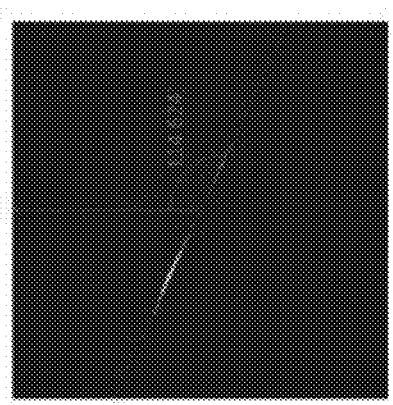
Figure 8A:
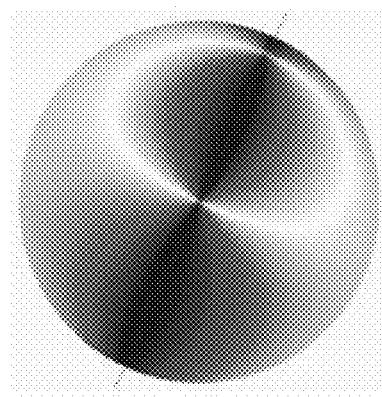

In step 4002 (FIG. 7a), a morphological erosion operation is performed on the on the binary image (of FIG. 8a) to reduce the detected minimum region 170 to a more refined line 171 (FIG. 8b). This step removes many of the noisy pixels (not shown) around the border and thins the center. FIG. 8b depicts the image resulting from step 4002.

In step 4003, a line-finding algorithm is applied to extract the Sun-zenith line. In one embodiment, the line-finding algorithm used is a Hough transform. See, e.g., R. O. Duda and P. E. Hart, "User of the Hough Transform to detect lines and curves in pictures," Comm. ACM, Vol. 15, pp. 11-15, 1972.

After the line intersecting the Sun and zenith is found in step 3006, the Sun's azimuth 3003 can be located along the Sun-zenith line.

In step 3007 of FIG. 7, convergence features can be found at the sun and zenith. Corner finding algorithms or other methods known in the art may be used to find the convergent (nodal) features at the sun and the zenith. These features (illustrated in FIG. 6b) can also be used to determine the Sun azimuth 3003. In this regard, the slope of line between the convergent features is the Sun azimuth 3003. In addition, the zenith position 3087 is directly derived from either the expected zenith from IMU roll/pitch (from 3001) or step 3007.

In step 3004, the signal processing unit determines if the Sun is visible in the open optical channel of the sky polarimeter 110. (The open optical channel is discussed further with respect to FIG. 11.) if the sun is not visible, the Sun elevation is found using steps 3005 and 3007 discussed above.) If the sun is visible, in step 3009 the centroid of the Sun can be found in $S_0$. In step 2010, the distance between zenith 3087 and the Sun position output from 3009 is converted to angular distance, subtracted from 90°, and this calculated value is the measured Sun elevation 3011. Sun elevation may also be calculated from the same distance calculation method using convergence features from 3007.

Calculation of Platform Yaw

The platform yaw is calculated as the difference between the measured/calculated Sun azimuth 3003 (FIG. 7) and the estimated Sun azimuth (from 1018, FIG. 3b). In one embodiment, the angle of the Sun-zenith line is calculated using a Hough transform with respect to the sensor's positive y-axis, and the expected Sun azimuth comes from the generally known sensor location and the time and date.

FIG. 8c depicts the results of calculating platform yaw in step 1014 in FIG. 3b, with the final calculated angle, 114.624°. This angle represents the measured or calculated Sun azimuth 3003 (FIG. 7). For the simulation, the platform was purposefully pointed north (i.e., sensor yaw=0°) so that the difference between the expected Sun azimuth and calculated Sun-zenith line angle (representing the measured Sun azimuth) should be zero. To calculate yaw, we subtract these two values as shown:

$$\text{Yaw} = \text{Azimuth}_{Sun} - \text{Azimuth}_{calculated} = 114.186° - 114.624° = 0.162° \quad (4)$$

where the Yaw represents the sensor yaw and the Sun's azimuth is calculated based on the known date/time and general platform latitude/longitude. The calculated platform yaw was 0.162°, whereas the actual yaw was 0.0°. Therefore, the error is 0.162°. This inaccuracy does not include measurement noise, but represents only process noise. Also, this process noise could be improved by performing additional pre-processing steps or improving the thresholding operation.

Note that in the preceding paragraph, $\text{Azimuth}_{Sun}$ comes from the Sun position equation and $\text{Azimuth}_{Calculated}$ comes from the difference between the Sun-zenith line direction and the reference axis. For this example, both approaches should yield the same value but the first uses no polarization info, just the platform latitude/longitude and time.

Note also that the Sun's azimuth is along the Sun-Zenith line. This line angle is measured with respect to some reference direction on the platform. For example, here the positive y-direction of the platform was pointed North so that the angle between the Hough line and this direction represents the sensor, and thus platform, yaw. This value is called $\text{Azimuth}_{Calculated}$ in Eq. 4 above. The reference direction can be any value that is predefined (e.g., platform x direction, platform y direction, etc).

Figure 9A:
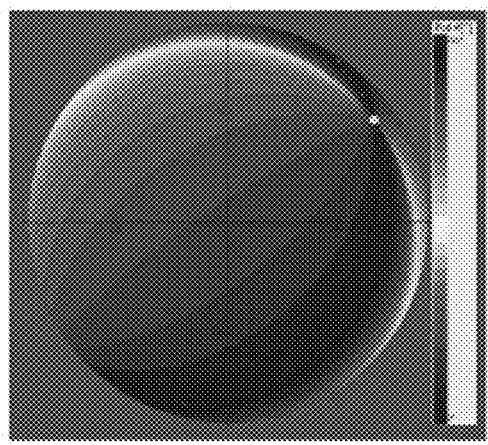
FIGS. 9a-9d depict the calculation of platform yaw using yaw algorithm for a platform rotated in yaw by 60° with a full hemispherical field of view.
Figure 9B:
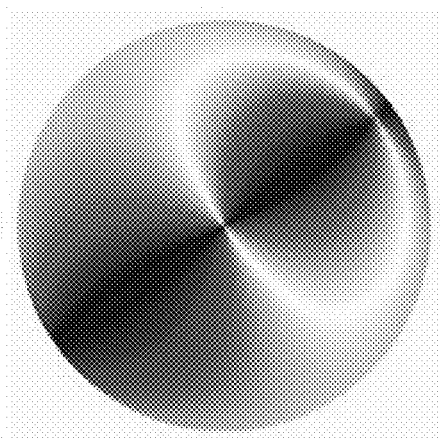
Figure 9C:
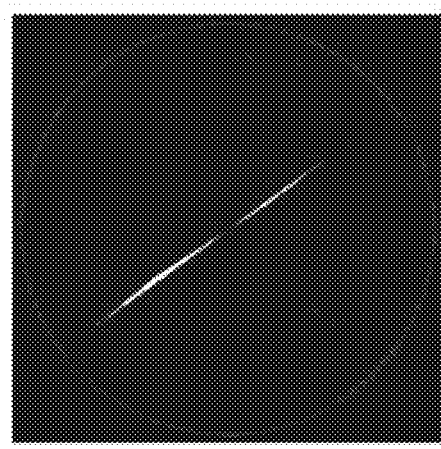
Figure 9D:
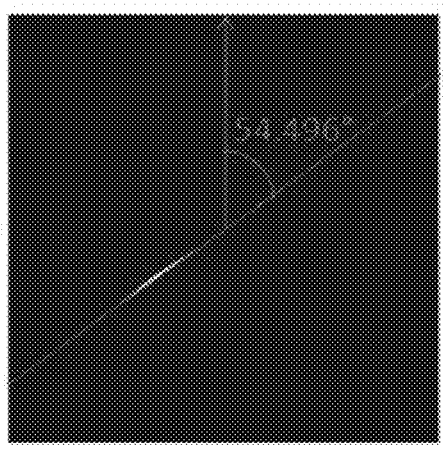

FIGS. 9a-9d depict another example of the yaw calculation in 1014 (FIG. 3b). In this example sky image data was collected in Huntsville, Ala. at 0800, with the platform rotated to absolute yaw of 60°. FIG. 9a depicts the measured AoP map, FIG. 9b depicts the calculated scanning AoP pattern using method 3005 (FIG. 7). FIG. 9c depicts the minimum plot from 4002 (FIG. 7a). FIG. 9d depicts the Hough line with calculated angle using 4003 (FIG. 7a). In this case, the Hough line angle was found to be 54.496°, meaning the sensor yaw is calculated as, $$\text{Yaw} = 114.786° - 54.496° = 60.290° \quad (5)$$

where, again, 114.786° is the azimuth of the Sun given the platform location and time/date. Therefore, the absolute error in the calculated platform yaw is 0.29°.

Figure 10A:
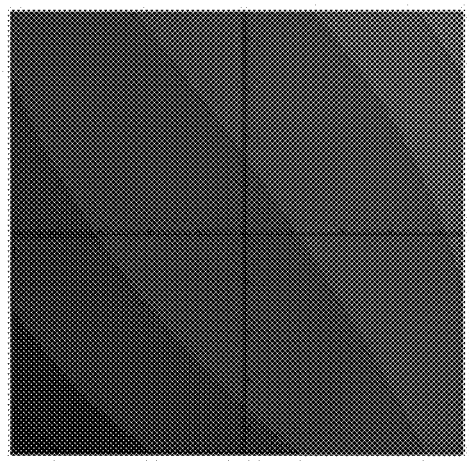
FIGS. 10a-10d depict the calculation of platform yaw using yaw algorithm or a platform rotated in yaw by −30° with a 90° field of view.
Figure 10B:
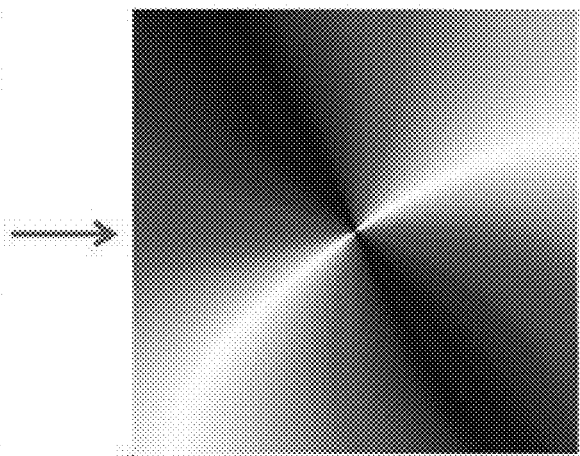
Figure 10C:
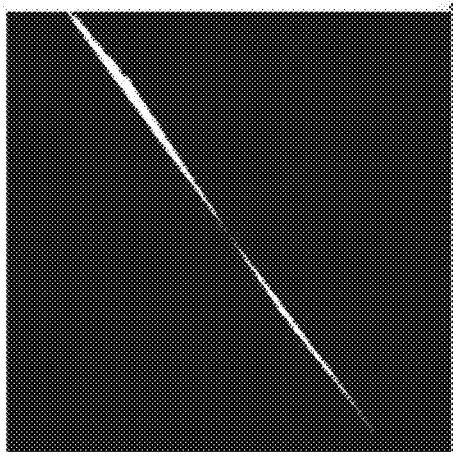
Figure 10D:
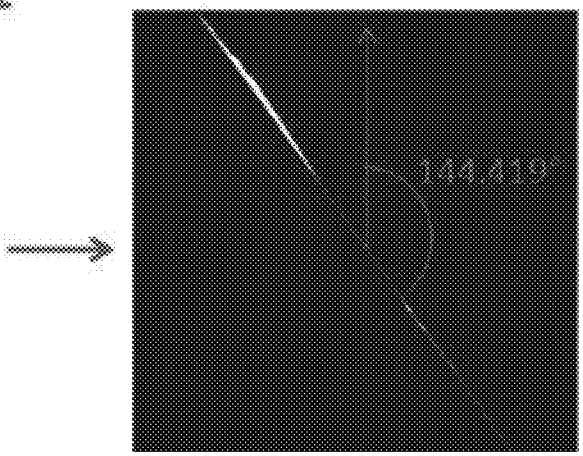

FIGS. 10a-10d depict another example of the yaw calculation using 3003 from FIG. 7 and Sun azimuth from 1018 (FIG. 3b). In this example sky image data was collected in Huntsville, Ala. at 0800, with the platform rotated to with the platform rotated to absolute yaw of −30' or 330°. FIG. 10a depicts the measured AoP map, FIG. 10b depicts the calculated scanning AoP pattern. FIG. 10c depicts the minimum plot. FIG. 10d depicts the Sun-zenith line with calculated angle. In these figures, the FONT of the sensor was limited to 45°.

In this case, the Sun-zenith line angle was found to be 144.419°, meaning the absolute yaw is calculated as, $$\text{Yaw} = 114.786° - 144.419° = -29.632° \quad (6)$$

From these examples, the platform yaw is demonstrated as calculable if three things are known:
1. Orientation of the sensor with respect to the platform's axes.
   a. Assume the two are aligned meaning there is no roll, pitch, or yaw of the sensor with respect to the platform's axes. Note that for an upward pointing sensor,
      i. $\text{Roll}_{sensor} = \text{Yaw}_{platform}$
      ii. $\text{Pitch}_{sensor} = \text{Pitch}_{platform}$
      iii. $\text{Yaw}_{sensor} = \text{Roll}_{platform}$
   b. If misaligned, the offsets in sensor roll, pitch, and yaw are known to good accuracy
2. Date and time of measurement
3. General latitude and longitude of platform at time of measurement (general, as in less than 150 km accuracy)

Calculation of Platform Roll and Pitch

Additionally, platform pitch and roll manifests as a displacement of the acquired polarimetric image. Specifically, for a northward pointing platform, the platform pitch corresponds to image translation along the y-direction while roll translates the image along the x-direction. In fact, neither of these will affect the calculated platform yaw angle. This is because yaw is dependent on the Sun-zenith angle with respect to the vertical image direction and image translation will not change this angle. The yaw angle is invariant to coordinate transforms that amount to linear translation since they are based on platform rotations about axes orthogonal to the one used to measure the yaw angle. Importantly, platform pitch and roll can be deduced from the displacement of the zenith from the image center, defined by the convergence of all polarization orientations in the rotating AoP coordinate frame. The displacement of the zenith in x and y pixels from the image center can be used to perform the conversion to pitch and roll in angular space. Therefore, this function of the sky polarimeter system can be used to calculate absolute roll and pitch in addition to yaw without use of GPS, a compass, or an IMU, or may be used to augment one or more of these sensors.

In FIG. 7, the zenith location 3087 may be used in conjunction with the known center pixel coordinate of the FPA to calculate the x- and y-axis offset of the zenith from the center pixel. This offset is then converted into angular coordinates which correspond to the sensor roll and pitch.

Calculation of Platform Latitude and Longitude

Latitude and longitude of the platform can be determined using the elevation of the Sun 3011 (90° minus the distance between Sun and zenith). With enough measurements averaged over time and/or an initial latitude/longitude estimate, a more precise estimate of latitude/longitude can be deduced using this measured Sun elevation. Thus, the system could be used to augment GPS when GPS is denied or unavailable.

The Sun elevation will provide a "region" on the Earth that may yield that measurement at the given time and date. By observing the change of the Sun elevation over time, or by moving the platform, this region can be refined.

Knowing the general latitude and longitude and estimating yaw from the prior described method, the system can analyze the scanning AoP images from step 3005 (FIG. 7) to determine the Sun elevation. From the Sun elevation, platform latitude and longitude can be calculated. The solar kinematic model from 201 is applied to determine the region on the Earth surface that would provide the measured Sun elevation at the given date/time. This region is likely large (on the order of multiple kilometers) for a single measurement. However, by observing the Sun's elevation change over a period of time, this position can be further refined. Likewise, noisy positional estimates can be averaged over time for a stationary or slowly moving vehicle to provide a better accuracy positional estimate. Additionally, these positional estimates can be fused with dead reckoning sensors (IMU, odometry) in a Kalman filter or variant to provide an even better solution: in this case the dead reckoning errors are bounded by the less accurate sky polarization positional information. Thus, the sky polarization system could augment GPS information when GPS is denied or unavailable.

To determine the accuracy of this measurement, a difference image was generated using two scanning AOP maps from the model, separated on the Earth by a certain distance. Then, the difference image is analyzed to determine if measurements at specific distances are within a typical sensor noise model.

Figure 12:
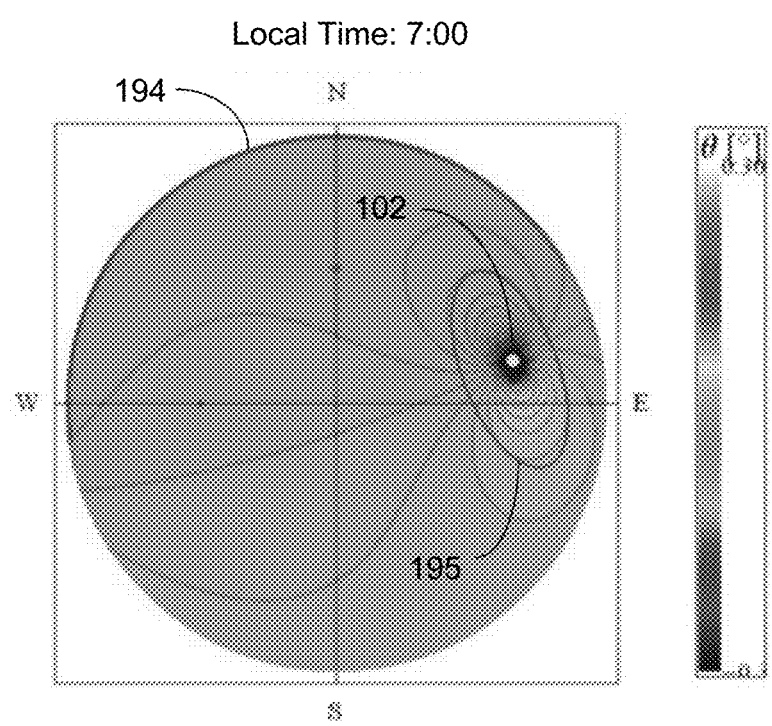
FIG. 12 depicts an AoP difference image for separated distances of 1 km and 10 km on Hawaii on May 23, 2008.

FIG. 12 depicts the difference image for a separated distance of 1 Km on Hawaii on May 23, 2008. These difference images were also tested for 10 km using the same parameters. The AoP measurements offer some contrast at distances of both 1 km and 10 km. For 1 km, the section of map where detection is possible is confined within the overlaid red oval 195, which represents the ±0.1° change contour. Thus, the AoP change at a 1 km distance is measurable on the map within this area. In the 10 km case, most of the image provides a measurable difference in AoP. Thus, single measurement accuracy of latitude and longitude of 1-10 km are expected.

Note that general positional information (i.e. latitude, longitude) is needed to calculate the Sun azimuth and subsequently platform yaw (i.e. within 150 km). This azimuth/yaw is required along with Sun elevation to determine platform position (latitude, longitude). Initial prior information regarding a starting lat/lon position is therefore needed to seed the initial measurement. If this information is not available, the platform must remain stationary to provide a sufficient stare time of the Sun motion to determine the sun azimuth and elevation components of the vector and better refine the platform position on Earth.

Sky Polarimetry Sensor Example

FIG. 11 depicts an exemplary embodiment of a sky polarimetry sensor 101. The sensor 101 comprises a sky polarimeter 110 and a signal processing unit 107 housed together within a chassis 301. The sensor 101 comprises three (3) optical channels 311 in the illustrated embodiment, each channel 311 comprising an objective lens 303, a polarization filter 304, and a detector 312.

The three detectors 312 are part of a focal plane array 305. The focal plane array may comprise any of a number of focal plane array technologies, including, for example, complementary metal-oxide semiconductor (CMOS) focal plane array or charge coupled device (CCD) focal plane array. The polarization filters 304 are uniquely oriented, and in one embodiment three filters 304 are oriented at 0, 60 and 120 degrees.

Although the illustrated embodiment has three optical channels 311, other embodiments may have more channels 311. Further, some embodiments of the sky polarizer 110 comprise an additional, "open" channel (not shown) which does not comprise a polarization filter 304. The open channel simply attenuates the image from the lens 303. In this regard, a neutral density filter (not shown) instead of a polarizing filter in the open channel attenuates the signal.

A camera interface PCB 306 comprises the circuitry for the sky polarizer 110 and a FPGA processing PCB 307 comprises the circuitry for the signal processing unit 107. A power/video/output PCB 308 comprises the circuitry for powering the sensor 101 and interfacing with the navigation/localization applications 103 (FIG. 1). A panel 313 on the sensor 101 comprises a power interface 309 and a communication interface 310.

This disclosure may be provided in other specific forms and embodiments without departing from the essential characteristics as described herein. The embodiments described are to be considered in all aspects as illustrative only and not restrictive in any manner.

What is claimed is:

1. A method of determining orientation of an object, the method comprising:
    recording raw image data of the sky using a sky polarimeter;
    calculating Stokes parameters ($S_0$, $S_1$, $S_2$), degree of linear polarization (DoLP) and angle of polarization (AoP) from the image data;
    detecting obscurants and filtering the obscurants from the image data to produce a filtered image;
    obtaining position/orientation data of the object;
    finding the Sun azimuth and elevation in the filtered image by performing a coordinate transform on a measured polarization pattern to generate a scanning AoP image;
    determining one or more of the roll, pitch, yaw, latitude and longitude of the object using the filtered image;
    when yaw is determined using the filtered image, calculating platform yaw based on the angle between the line intersecting the Sun and the zenith and expected Sun/azimuth position for a given date and time;
    performing minimum detection and extracting a region of the image containing the Sun and zenith;
    applying morphological erosion on a binary image to reduce the detected minimum region to a single line; and
    extracting a sun-zenith line.

2. The method of claim 1, further comprising fusing a position estimate and a position prediction of the object to determine the new position/orientation of the object.

3. The method of claim 1, wherein the step of finding the Sun azimuth and elevation in the filtered image comprises finding the Sun azimuth from a zenith value in a fixed AoP image.

4. The method of claim 1, wherein, the step of finding the Sun azimuth and elevation in the filtered image comprises performing a coordinate transform on a measured polarization pattern to generate a scanning AoP image.

5. The method of claim 1, wherein the step of extracting the sun-zenith line comprises performing a Hough transform.

6. The method of claim 1, wherein the sky polarimeter comprises three or more polarization optical channels, each polarization optical channel comprising a uniquely-oriented polarization filter.

7. The method of claim 6, wherein the sky polarimeter further comprises an open optical channel that attenuates image data received from an objective lens without polarization.

8. The method of claim 7, wherein the step of finding the Sun azimuth and elevation in the filtered image further comprises detecting the sun in the open optical channel.

9. The system of claim 8, wherein the step of finding the Sun azimuth and elevation in the filtered image further comprises finding the centroid of the sun in S0 and calculating the distance between the Sun and the zenith, which distance is the Sun elevation.

\* \* \* \* \*